(No Model.) 2 Sheets—Sheet 1.

W. S. WIKLE.
HAND PLANTER.

No. 396,185. Patented Jan. 15, 1889.

WITNESSES:
W. R. Davis.
C. Sedgwick

INVENTOR,
W. S. Wikle
BY Munn & Co.
ATTORNEY.

(No Model.) 2 Sheets—Sheet 2.
W. S. WIKLE.
HAND PLANTER.
No. 396,185. Patented Jan. 15, 1889.
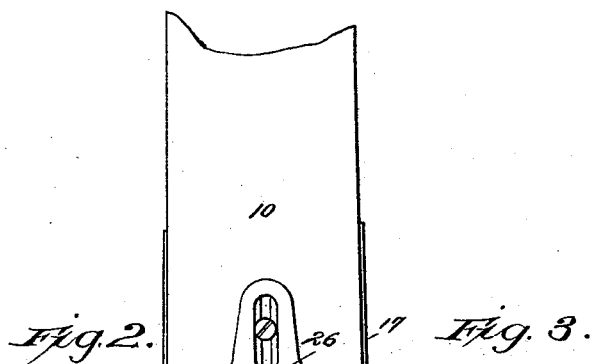
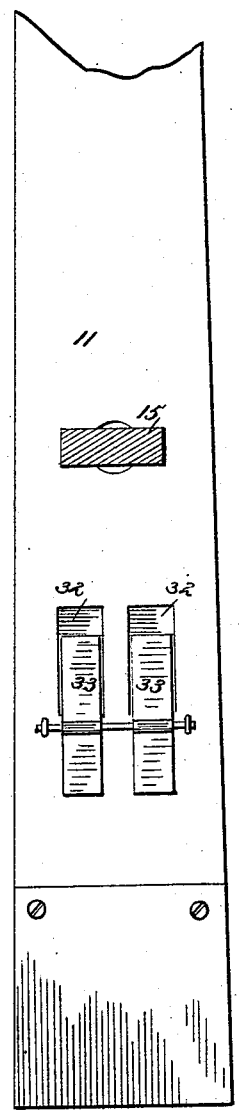
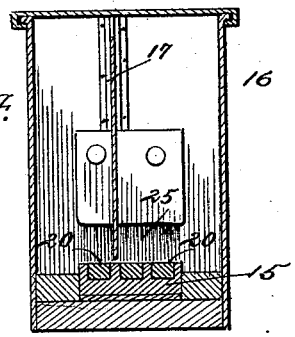
WITNESSES:
W. R. Davis.
C. Sedgwick.
INVENTOR
W. S. Wikle
BY Munn & Co.
ATTORNEY.
N. PETERS, Photo-Lithographer, Washington, D. C.

United States Patent Office.

WILBER S. WIKLE, OF UNION, WEST VIRGINIA.

HAND-PLANTER.

SPECIFICATION forming part of Letters Patent No. 396,185, dated January 15, 1889.

Application filed May 10, 1888. Serial No. 273,431. (No model.)

*To all whom it may concern:*

Be it known that I, WILBER S. WIKLE, of Union, in the county of Monroe and State of West Virginia, have invented a new and useful Improvement in Hand-Planters, of which the following is a full, clear, and exact description.

My invention relates to an improvement in hand-planters, and has for its object to provide a simple and conveniently-operated apparatus, by means of which corn and beans may be planted at the same time and fertilizer simultaneously distributed; and a further object of the invention is to provide for the adjustment of the openings receiving the seed, and also the adjustment of the valves of the fertilizer-chute.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
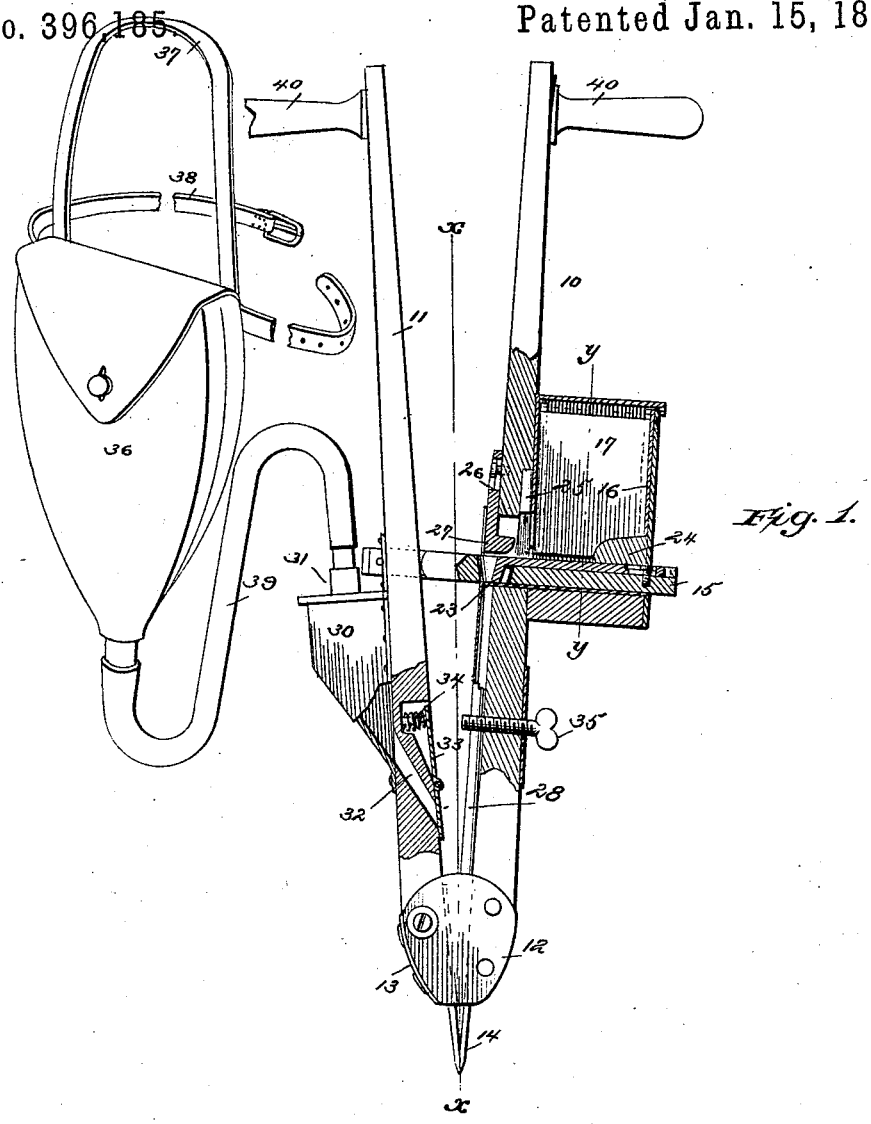
Figure 5:
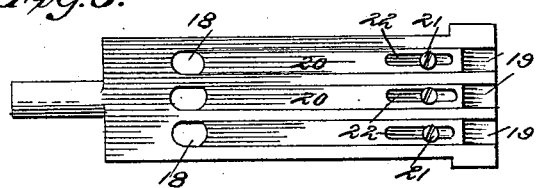

Figure 1 is a side elevation of the apparatus, partly in section. Figs. 2 and 3 are inside views of the body of the apparatus detached, the section being taken on line *x x* of Fig. 1. Fig. 4 is a vertical section on line *y y* of Fig. 1, and Fig. 5 is a detail plan view of the seed-dropper.

The body of the apparatus consists of two vertical essentially-rectangular arms or beams, 10 and 11, which beams are hinged at their lower ends by means of attached end plates, 12, as best shown in Fig. 1. The said arms 10 and 11 are also provided at their sides with a metal casing, 13, secured thereto in any suitable manner, which casings are adapted to project downward in vertical lines to form a chute or mouth, 14, which mouth is opened as the arms 10 and 11 are brought together and closed when said arms are drawn apart.

At or near the center of the arm 10 a recess is formed, through which recess the dropping-bar 15 is projected to a pivotal connection with the opposing arm 11. The said drop-bar is adapted to project outward beyond the arm 10 and through a receptacle, 16, attached to the outer side of said arm, as shown in Fig. 1 and in detail in Fig. 4. The receptacle 16 is provided with a detachable central slide, 17, consisting of a metal plate adapted to travel in vertical grooves or ways formed upon opposing sides of the receptacle, thus dividing the same, when desired, into two compartments.

The drop-bar 15 is provided near its inner end with a series of three or more spaced apertures, 18, and a similar number of longitudinal grooves, 19, which grooves are adapted to extend from the said apertures through to the outer end. In the grooves 19 slides 20 are placed, the movements of which slides are limited by means of set-screws 21, passing through slots 22 in said slides and into the body of the drop-bar, as best shown in Fig. 5. Each of the slides 20 is provided with a downwardly-projecting lip, 23, which lips are adapted to enter the apertures 18. Thus the diameter of said apertures may be reduced and enlarged at pleasure by simply manipulating the slides 20, carrying them in toward the arm 11 or out therefrom. This construction is fully illustrated in section in Fig. 1.

Within the receptacle 16 and above the drop-bar 15 a block, 24, is secured to the outer side, having an inclined face, which block extends from side to side of the receptacle and is adapted to throw the seed in the direction of the apertures in the drop-bar as said drop-bar is manipulated. The inner wall of the receptacle 16 is centrally cut away opposite the opening in the arm 10, and above said opening brushes 25 are attached to the outer face of the said arm 10, which brushes project downward and are adapted to sweep the upper surface of the drop-bar.

To the inner face of the arm 10 an adjustable damper, 26, is secured, which damper is provided with an outwardly-projecting arm, 27, located above the upper face of the drop-bar, whereby the seeds which have been fed into the apertures of the drop-bar are prevented from working out therefrom.

Upon the inner face of the arm 10, below the drop-bar, three tubes, 28, are attached, which tubes are extended downward nearly to the end of said arm, the upper ends of the tubes being so located that when the arm 10 has been carried outward to its farthest extent one of the tubes will be immediately beneath each of the apertures 18 of the drop-bar. The inner tube, as best shown in Fig. 2, is carried perpendicularly downward, while the two outer tubes are made to extend diagonally downward in the direction of the opposite ends of the arm 10. In order that the seed passing down the tubes 28 may not drop in a bunch shields 29 are attached to the inner face of the arm 10 at the inner side of each of the outer tubes, whereby the seed dropping from the outer tubes is dropped away from a central line through the arm 10, while the seed in the central tube will drop perpendicularly downward.

To the outer side of the arm 11 a receptacle, 30, is attached, which receptacle is adapted to receive fertilizer, and is provided with an inclined bottom and a detachable cover, to which cover upon the upper side a collar, 31, is secured.

In the arm 11 a downwardly-inclined transverse opening, 32, is produced, which opening connects with the receptacle 30, intersecting the space intervening the two arms 10 and 11. I preferably employ two of these openings 32, located as shown in Fig. 3, each of which is provided with a valve, 33. The said valves are pivoted at or near their center to the inner face of the arm 11, their lower ends being normally held over the opening 32 by means of a spring, 34, located within a recess in the said arm 11, and having a bearing against the inner face of the upper ends of said valves, as best illustrated in Fig. 1. In order to manipulate the valves a set-screw, 35, is projected through the arm 10, one set-screw being provided for each valve, the inner ends of which screws are purposed to engage the upper outer surface of the valves.

The receptacle for the fertilizer consists, preferably, of a bag, 36, provided with a strap, 37, attached to each end and adapted to be worn over the shoulder, and a second strap, 38, purposed to be buckled around the chest of the operator. For convenience, the bag is worn so as to be located beneath the arm. The bag 36 is connected with the collar 31 of the receptacle 30 by means of a flexible tube, 39.

In operation, the seed to be planted is placed in the receptacle 16, the fertilizer in the bag 36. The fertilizer in the bag 36 will, by means of the communicating-tube 39, pass freely down into the receptacle 30, attached to the arm 11. If it is desired in planting that fertilizer should be distributed at the same time, the set-screws 35 are carried inward a sufficient distance to open the valves 33, when the two arms 10 and 11 are brought together any desired distance, so as to provide for the release of a suitable quantity of the seed. These provisions having been made, the operator grasps the two arms 10 and 11 by means of their attached handles 40 and 40 and brings the said arms essentially in contact one with the other, whereupon the apertures 18 in the drop-bar will be brought within the receptacle and the grain will fall in said apertures. Now, by separating the two arms the brush 25 will sweep off the superfluous grain, while the apertures 18 will be brought in register with the several tubes 28, the damper 26 preventing the grain from riding upward and forcing the same to take a downward passage through the tubes. If the set-screws have been placed to manipulate the valves, when the two arms are brought together the said valves will be opened by the set-screws and the fertilizer allowed to escape. Thus the fertilizer will be first deposited in the hill, the corn or other seed to be planted dropping afterward.

In planting, I prefer that the grain be dropped first and the fertilizer introduced afterward. At the outstart, however, the fertilizer is dropped first and afterward the grain, as above set forth.

Having thus described my invention, what I claim as new, and desire to secure by Letters Patent, is—

In a hand-planter, the combination, with vertical parallel arms hinged at their lower ends, one of which arms is provided with a diagonal bore, and a receptacle secured to the outer side of one arm communicating with said bore, of a bag adapted to contain fertilizer, a flexible tube connecting said bag and receptacle, a spring-actuated valve hinged to the inner side of one arm, covering the inner end of the bore therein, and a set-screw passing through the opposing arm and adapted for engagement with said valve, as and for the purpose specified.

WILBER S. WIKLE.

Witnesses:
JOHN OSBORNE,
M. J. KESTER.